United States Patent
Brandt et al.

(10) Patent No.: US 7,349,922 B2
(45) Date of Patent: Mar. 25, 2008

(54) METHOD AND APPARATUS FOR DATA CLUSTERING INCLUDING SEGMENTATION AND BOUNDARY DETECTION

(75) Inventors: Achi Brandt, Rehovot (IL); Eitan Sharon, Rehovot (IL); Ronen Basri, Rehovot (IL)

(73) Assignee: Yeda Research and Development Co. Ltd., Rehovot (IL)

( * ) Notice: Subject to any disclaimer, the term of this patent is extended or adjusted under 35 U.S.C. 154(b) by 756 days.

(21) Appl. No.: 10/398,029

(22) PCT Filed: Nov. 14, 2001

(86) PCT No.: PCT/US01/43991

§ 371 (c)(1),
(2), (4) Date: Aug. 14, 2003

(87) PCT Pub. No.: WO02/057955

PCT Pub. Date: Jul. 25, 2002

(65) Prior Publication Data

US 2004/0013305 A1    Jan. 22, 2004

(51) Int. Cl.
*G06F 17/00* (2006.01)
*G06K 9/00* (2006.01)

(52) U.S. Cl. .................... 707/104.1; 382/224; 382/266

(58) Field of Classification Search ................ 382/173, 382/224, 162, 164, 225, 266; 707/100, 104.1, 707/101
See application file for complete search history.

(56) References Cited

U.S. PATENT DOCUMENTS

| | | | |
|---|---|---|---|
| 5,123,057 A | 6/1992 | Verly et al. | |
| 5,708,767 A | 1/1998 | Yeo et al. | |
| 6,012,058 A | 1/2000 | Fayyad et al. | |
| 6,078,688 A | 6/2000 | Cox et al. | |
| 6,189,005 B1 * | 2/2001 | Chakrabarti et al. | 707/6 |
| 6,330,372 B1 * | 12/2001 | Goldstein et al. | 382/266 |
| 6,502,105 B1 * | 12/2002 | Yan et al. | 707/104.1 |
| 6,778,698 B1 * | 8/2004 | Prakash et al. | 382/164 |

OTHER PUBLICATIONS

Hofmann et al., Unsupervised Segmentation of Textured Images by Pairwise Data Clustering, Image Processing, 1996, Proceedings., International Conference on vol. 3, Sep. 16-19, 1996, pp. 137-140 vol. 3.*

* cited by examiner

*Primary Examiner*—Greta L Robinson
(74) *Attorney, Agent, or Firm*—Martin Fleit; Paul D. Bianco; Fleit Kain Gibbons Gutman Bongini & Bianco P.L.

(57) ABSTRACT

A method and apparatus for clustering data, particularly regarding an image, that constructs a graph in which each node of the graph represents a pixel of the image, and every two nodes represent neighboring pixels associated by a coupling factor. Block pixels are selected with unselected neighboring pixels coupled with a selected block to form aggregates. The graph is coarsened recursively by performing iterated weighted aggregation to form larger blocks (aggregates) and obtain hierarchical decomposition of the image while forming a pyramid structure over the image. Saliency of segments is detected in the pyramid, and by computing recursively, a degree of attachment of every pixel to each of the blocks in the pyramid. The pyramid is scanned from coarse to fine starting at the level a segment is detected, to lower levels and rebuilding the pyramid before continuing to the next higher level. Relaxation sweeps sharpen the boundaries of a segment.

15 Claims, 7 Drawing Sheets

 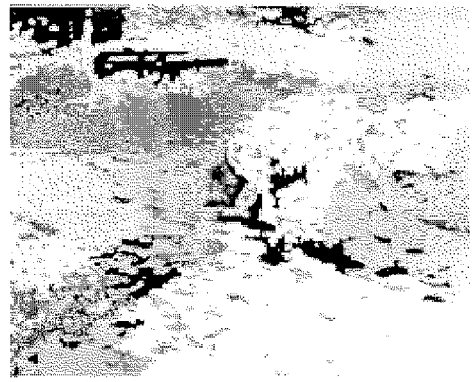
FIG.12A  FIG.12B
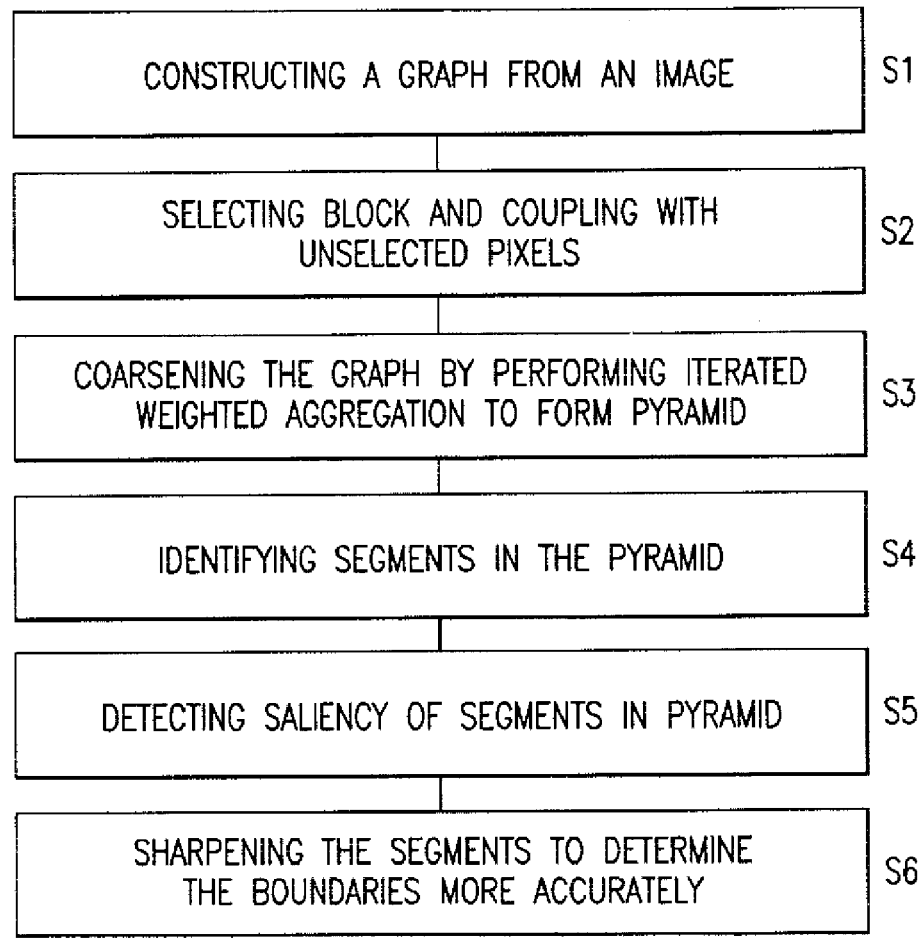
FIG.13

METHOD AND APPARATUS FOR DATA CLUSTERING INCLUDING SEGMENTATION AND BOUNDARY DETECTION

This application is a U.S. National Phase Application under 35 USC 371 of International Application PCT/US/01/43991 (published in English) filed Nov. 14, 2001.

BACKGROUND OF THE INVENTION

1. Field of the Invention

The present invention relates to a method and apparatus for data clustering, especially regarding images, utilizing a novel fast, multiscale algorithm. More particularly, the present invention relates to a method and apparatus for image segmentation and boundary detection.

2. Description of the Prior Art

Data clustering is the task of inferring properties of large amounts of data. Clustering is obtained through a process of unsupervised learning in which the data is split into clusters, which reveal its inner structure. Methods are known which employ a large class of graph algorithms adapted to deal with the data clustering problem, and more particularly, the segmentation problem. The algorithms employed typically construct a graph in which the nodes represent the pixels in the image and arcs represent affinities ("couplings") between nearby pixels. In these methods, the image is segmented by minimizing a cost associated with cutting the graph into sub-graphs. In the simpler version, the cost is the sum of the affinities across the cut. Other versions normalize this cost by dividing it by the overall area of the segments or by a measure derived from the affinities between nodes within the segments. Normalizing the cost of a cut prevents over-segmentation of the image. Attaining a globally optimal solution for normalized-cuts measures is known to be NP-hard even for planar graphs. Some variations of normalized-cuts measures can be found in polynomial time, but the runtime complexity of these methods is $O(N^2 \log N)$, where N denotes the number of pixels in the image. Therefore, approximation methods are used. The most common approximation method uses spectral techniques to find a solution. These spectral methods are analogous to finding the principal modes of certain physical systems. With these methods, and exploiting the sparseness of the graph, a cut can be found in $O(N^{3/2})$.

SUMMARY OF THE INVENTION

The method and apparatus of the present invention have utility for a variety of applications. For example, the invention can be used in correlating correspondence of images. That is, to show that image 1 corresponds to image 2 and outline the exact correspondence. Also, the invention can be used to construct and manipulate 3D images in similar ways. The invention has application in the field of transferring images on the web. Where one maintains a large database and retrieves from it a particular image, it is possible to scan for a coarse representation of the image and then send or transmit the coarse representation of the image only as the first step in retrieval. This has the obvious effect of reducing bandwidth requirements and of effecting the transaction in substantially less time. Further, the invention has application in registration problems where a camera is in motion, changing its position, and it is desired to compare and register two images obtained from different positions or angles. The invention also has applicability in the fields of imaging, such as satellite images, electron microscopic images and medical images, particularly as regards analysis of the image to derive salient features towards their classification. The invention provides a decomposition algorithm that can learn to provide feedback. In essence, the image in electronic form is decomposed and represented in a coarser form in a manner that contains the essential information regarding its properties, including shape, boundaries, statistics, texture, color, differences, intensities and any other attribute or property of the image that can be measured.

In accordance with the present invention, a method and apparatus is provided that in a first embodiment employs a novel and unique fast graph algorithm for clustering that finds an approximate solution to normalized cut measures and whose runtime is linear in the number of edges in the graph. By the practice of the present invention, in just one pass the algorithm provides a complete hierarchical decomposition of the graph into clusters. The novelty and uniqueness of the present invention is demonstrated by applying it to the case of image segmentation. Image segmentation is a process of grouping together neighboring pixels whose properties (e.g., intensity values) are coherent. The resulting regions may indicate the presence of objects or parts of objects, and may be verified (or modified) later following a top-down analysis of the image and recognition. One principal advantage of the present invention is that the novel algorithm employed for segmentation has been constructed efficiently so that it can faithfully extract regions of different sizes from an image.

Like the prior art the method and apparatus of the present invention employs the unique algorithm to find an approximate solution to a normalized cut problem, but the present invention distinguishes from the known art by doing so in time that is linear in the number of pixels in the image with only a few dozen operations per pixel. Since a typical image may contain several hundreds of thousands of pixels, the factor $\sqrt{N}$ gained may be quite significant. The algorithm is based on representing the same minimization problem at different scales, enabling fast extraction of the segments that minimize the optimization criterion. Because of its multi-scale nature, the algorithm provides a full hierarchical decomposition of the image into segments in just one pass. In addition, it allows modifying the optimization criterion with scale enabling incorporation of higher order statistics of the segments when their size is sufficiently large to allow reliable extraction of such statistics. The algorithm relates to the same physical systems whose modes are found by the spectral methods, but uses modern numeric techniques that provide a fast and accurate solution to these problems. The results of running the novel algorithm on a variety of images present a significant improvement over the results obtained by the spectral methods.

In the method and apparatus of the present, the novel algorithm proceeds as follows. Given an image, first a graph is constructed so that every pixel is a node in the graph and neighboring pixels are connected by an arc. A weight is associated with the arc reflecting the likelihood that the corresponding pixels are separated by an edge. To find the minimal cuts in the graph, the graph is recursively coarsened using a unique weighted aggregation procedure in which repeatedly smaller sets of representative pixels (blocks) are selected. These representative pixels do not have to lie on a regular grid, giving rise to an irregular pyramid. The purpose of these coarsening steps is to produce smaller and smaller graphs that faithfully represent the same minimization problem. In the course of this process segments that are distinct from their environment emerge and they are detected at their appropriate size scale. After constructing the entire pyramid, the pyramid is scanned from the top down performing relaxation sweeps to associate each pixel with the appropriate segment.

In the simple version of the unique algorithm, the couplings between block pixels at a coarse level are computed directly from the couplings between finer level pixels. In a variation of this algorithm, the couplings are modified between block pixels to reflect certain global statistics of each block. These statistics can be computed recursively throughout the coarsening process and may include the average intensity level of the blocks, the position of their center, their principal orientation, their area, texture measurements, etc. This enables, for example, identification of large segments even if the intensity levels separating them vary gradually.

Although pyramidal structures have been used in many algorithms for segmentation, such methods that use regular pyramids have difficulties in extracting regions of irregular structures. Prior known methods that construct irregular pyramids are strongly affected by local decisions. Fuzzy C-means clustering algorithms avoid such premature decisions, but they involve a slow iterative process. Also related as of general interest are algorithms motivated by physical processes.

The method and apparatus of the present invention employs an algorithm that uses modern numeric techniques to find an approximate solution to normalized cut measures in time that is linear in the size of the image (or more generally, in the number of edges in the clustering graph) with only a few dozen operations per pixel. In just one pass the algorithm provides a complete hierarchical decomposition of the image into segments. The algorithm detects the segments by applying a process of recursive coarsening in which the same minimization problem is represented with fewer and fewer variables producing an irregular pyramid. During this coarsening process the method can compute additional internal statistics of the emerging segments and use these statistics to facilitate the segmentation process. Once the pyramid is completed it is scanned from the top down to associate pixels close to the boundaries of segments with the appropriate segment. The efficacy of the method is demonstrated by applying it to real images.

In a further embodiment of the invention, an improved method and apparatus is described that utilizes the segmentation by weighted aggregation (SWA) noted above and provides improvements that enable the inventive method and apparatus to achieve a superior result. This improvement will be described in detail hereinafter, and the advantages that accrue will become more evident.

Other objects and advantages of the present invention will become more readily apparent from the following detailed description of the method and apparatus of the present invention when taken in conjunction with the appended drawings.

BRIEF DESCRIPTION OF THE DRAWINGS

FIGS. 5a to d show in FIG. 5 the effect of average intensities of 10×10 pixel squares, in FIG. 5b their bilinear interpolation, in FIG. 5c average intensities of 73 pixel aggregates and in FIG. 5d their interpolations, the original image is shown in FIG. 6a.

FIGS. 12a and b show in FIG. 12a an input image and in FIG. 12b the result of the application of the present invention.

FIG. 13 shows a generalized flow chart of the method of the present invention.

DETAILED DESCRIPTION OF SPECIFIC EMBODIMENTS OF THE INVENTION

Figure 1A:
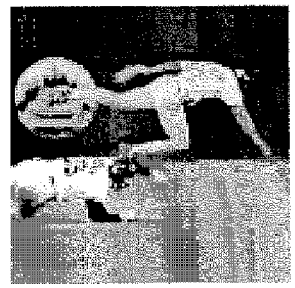
FIG. 1a shows an input image.
Figure 1B:
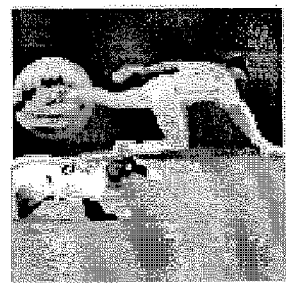
FIG. 1b shows the picture was divided into two segments extracted by the method and apparatus of the present invention at a scale 11 (the boundaries of the segments being highlighted)
Figure 1C:
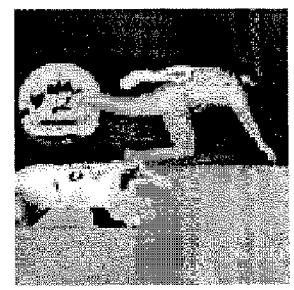
FIG. 1c shows at scale 8 five segments stood out, two capturing most of the bodies of the two players, one captures the hand of one of the players, and one captures the head of the other.
Figure 1D:
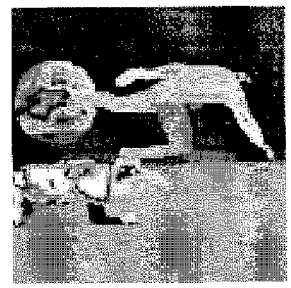
FIG. 1d shows at scale 7 smaller segments are obtained, separating some of the body parts of the two players.

The inventive method and apparatus will now be described in detail with respect to specific embodiments. In the first embodiment, given an image $\Omega$ that contains $N=n^2$ pixels, a graph is constructed in which each node represents a pixel and every two nodes representing neighboring pixels are connected by an arc. In the implementation of the method each node is connected to the four neighbors of the respective pixel, producing a planar graph. It should be noted, however, that the inventive method can be applied also to non-planar graphs. In fact, the graphs obtained following the coarsening steps to be described hereinafter are non-planar. In the discussion below, a pixel is denoted by an index i∈{1, 2, ... N} and its intensity by $g_i$. To every arc connecting two neighboring pixels i and j, a positive coupling value $a_{ij}$ is assigned reflecting the degree to which they tend to belong to the same segment. For example, $a_{ij}$ could be a decreasing function of $|g_i-g_j|$. In the implementation, local responses are used to edge filters to determine the couplings between elements (see below).

To detect the segments, associated with the graph is a state vector $u=(u_1, u_2, \ldots, u_N)$ where $u_i \in R$ is a state variable associated with pixel i. We define a segment $S^{(m)}$ as a collection of pixels, $$S_m = \{i_{m_1}, i_{m_2}, \ldots, i_{m_{n_m}}\}$$

and associate with it a state vector $u^{(m)}=(u_1^{(m)}, u_2^{(m)}, \ldots, u_N^{(m)})$, in which $$u_i^{(m)} = \begin{cases} 1 & \text{if } i \in S_m \\ 0 & \text{if } i \notin S_m \end{cases} \quad (1)$$

In practice, the state variables are allowed to take nonbinary values. In particular, it is expected that pixels near fuzzy sections of the boundaries of a segment may have intermediate values $0<u_i^{(m)}<1$ reflecting their relative tendency to belong to either the segment or its complement.

Next, is defined an energy functional to rank the segments. Consider first the functional $$E(u) = \sum_{\langle i,j \rangle} a_{ij}(u_i - u_j)^2, \quad (2)$$

where the sum is over all pairs of adjacent pixels i and j. Clearly, for an ideal segment (with only binary state variables) $E(u^{(m)})$ sums the coupling values along the boundaries of $S_m$. With such a cost function small segments (and similarly very large ones) are often encouraged. To avoid such preference-this energy can be modified as follows:

$$\Gamma(u) = E(u)/V^\alpha(u), \quad (3)$$

where V(u) denotes the "volume" of the respective segment, $V(u)=\Sigma_i u_i$ and α is some predetermined parameter. Thus, for example, $V(u^{(m)})$ will measure the area in pixels of $S_m$. To avoid selecting very large segments we consider only segments whose total volume is less than half of the entire image. This is equivalent to defining the volume as min{V(u),N−V(u)}. Alternatively, the volume can be replaced by the product V(u)(N−V(u)). This and similar modifications of $\Gamma(u)$ can too be incorporated in the fast algorithm.

Note that setting α=0.5 will eliminate size preference since $\Gamma(u^{(m)})$ in this case is roughly the average of the couplings along the boundary of $S_m$. $E(u^{(m)})$ is the sum of the couplings along the boundary of $S_m$, and $$\sqrt{V(u^{(m)})}$$

is roughly proportional to the perimeter of $S_m$. In contrast, setting α>0.5 will create preference for large segments. In the implementation used α=1, which is equivalent to the so-called "average" or "normalized" cut measures.

Finally, the volume of u can be generalized by replacing V(u) by $$V_\phi(u) = \sum_{i=1}^N \phi_i u_i, \quad \sum_{i=1}^N \phi_i = N, \quad (4)$$

where $\phi_i$ is a "mass" assigned to the pixel i. This will become important in coarser steps when nodes may draw their mass from sets of pixels of different size. Also, in the finest scale we may assign lower volumes to pixels at "less interesting" or "less reliable" parts of the image, e.g., along its margins.

The inventive method and apparatus includes recursive step-by-step coarsening of the segmentation. In each coarsening step a new, approximately equivalent segmentation will be defined, reducing the number of state variables to a fraction (typically between ¼ and ½) of the former number. The coarsening is constructed such that each of the coarse variables represent several fine variables with different weights, and every fine variable will be represented by several coarse variables with different weights. The low-energy configurations of the coarse problem will reflect the low-energy configurations of the fine problem.

Below is described the first coarsening step. The state variables in the coarser problem can be thought of as the values (ideally 0 or 1) of a diluted set of pixels, i.e., a subset C of the original set of pixels. The values $u_i$ associated with the rest of the pixels (i∉C) will be determined from the coarse state variables using pre-assigned dependence rules. These rules will define Γ(u) as a functional of the smaller set of variables C, i.e., $\Gamma^c(\{u_i\}_{i \in C})$, and the dependence rules are selected so that the detection of segments with small $\Gamma^c$ (in the coarser problem) would lead to segments with small Γ (in the fine problem).

Generally, for any chosen subset of indices $$C \square \{c_k\}_{k=1}^K \subset \{1, 2, \ldots, N\},$$

denote $u_{c_k}$ as $U_k$, dependence rules are chosen of the form of a weighted interpolation rule:

$$u_i = \sum_{k=1}^K w_{ik} U_k, \quad (5)$$

where $w_{ik} \geq 0$, $$\sum_{k=1}^{K} w_{ik} = 1,$$

and for $i = c_k \in C$, $w_{ik} = 1$. Only local interpolation rules are considered, i.e., $w_{ik} = 0$ for all pixels $c_k$ not in the neighborhood of pixel i. The values of $w_{ik}$ will be determined by the coupling values only, and will not depend on the values of the state variables (see below).

Substituting equation 5 (weighted interpolation) into equation 2 (fine energy), the result is $$E^c(U) \Box E(u) = \sum_{k,l} A_{kl}(U_k - U_l)^2, \quad (6)$$

where the couplings $A_{kl}$ between the coarse-level variables are given by $$A_{kl} = \sum_{i \neq j} a_{ij}(w_{jl} - w_{il})(w_{ik} - w_{jk}). \quad (7)$$

In addition, substituting equation 5 (weighted interpolation) into equation 4 (fine volume), the result is $$V^c(U) \Box V_\phi(u) = V_\Phi(U) = \sum_{k=1}^{K} \Phi_k U_k \quad (8)$$

where $$\Phi_k = \sum_i \phi_i w_{ik}, k = 1, \ldots, K. \quad (9)$$

Thus, the dependence rules of equation 5 (weighted interpolation) yields $$\Gamma^c(U) \Box \Gamma(u) = E^c(U)/[V^c(U)]^\alpha. \quad (10)$$

The set C itself will be chosen in such a way that each pixel $i \notin C$ is strongly coupled to pixels in C. By this is meant roughly that $$\sum_{c_k \in C} a_{ic_k} \geq \beta \sum_j a_{ij}, \quad (11)$$

where β is a control parameter. This choice will ensure that for any low-energy configurations the values of u indeed depend, to a good approximation, on those of the subset U. This choice of C is common in applying fast, multiscale AMG solvers.

Now the interpolation rule in equation 5 (weighted interpolation) will be discussed. Given a segment $S_m$, $U^{(m)}$ is defined as $$U_k^{(m)} = \begin{cases} 1 & \text{if } c_k \in S_m, \\ 0 & \text{if } c_k \notin S_m, \end{cases} \quad (12)$$

and define $\tilde{u}^{(m)}$ as the configuration interpolated from $U^{(m)}$ by using Eq. 5. That is, $$\tilde{u}_i^{(m)} = \sum_{k=1}^{K} w_{ik} U_k^{(m)}. \quad (13)$$

Note that $E^c(U^{(m)}) = E(\tilde{u}^{(m)})$, $V^c(U^{(m)}) = V(\tilde{u}^{(m)})$, and hence $\Gamma^c(U^{(m)}) = \Gamma(\tilde{u}^{(m)})$. A proper interpolation rule should satisfy the condition that for every $S_m$, $\Gamma^c(U^{(m)}) = \Gamma(\tilde{u}^{(m)})$ is small if and only if $\Gamma(u^{(m)})$ is small.

One possible interpolation rule could be that a state variable $\tilde{u}_i$ for $i \notin C$ would inherit its state from the coarse state variable $U_k$ to which it is most strongly attached (in other words, $\tilde{u}_i = U_k$ such that $a_{ik}$ is maximal). This rule, however, may lead to mistakes in assigning the correct state to the interpolated variables due to nearby outliers, which in turn may result in a noticeable increase in the energy $E(\tilde{u}^{(m)})$ associated with the segment. Consequently, the minimization problem with the coarse variables will poorly approximate the minimization problem with the fine variables.

According to the invention, the interpolation weights are set as follows:

$$w_{ik} = \frac{a_{ic_k}}{\sum_{l=1}^{K} a_{ic_l}}, \forall i \notin C, c_k \in C. \quad (14)$$

These settings are commonly used by the AMG minimizer. (For a definition of weights that leads to an even more precise interpolation—see below.) With this interpolation rule the state of a variable $\tilde{u}_i$, $i \notin C$, is determined by several nearby coarse pixels with pixels coupled more strongly affecting its value more.

It is straightforward to verify that boundary sections of a segment across which intensity variations are sharp contribute very little to the energy associated with the segment, whereas sections of the boundary across which intensity is varying gradually contribute most of the energy of the segment. It can be shown further that when the problem is coarsened the contribution of such sections in general decreases by about half. Since the volume of a segment is roughly preserved when the problem is coarsened, for such a segment $S_m$ is obtained that is distinct from its surrounding $\Gamma^c(U^{(m)}) \approx \Gamma(u^{(m)}) \approx 0$, whereas for a segment $S_m$ that is not strongly decoupled along its boundaries $\Gamma^c(U^{(m)}) \approx \frac{1}{2}\Gamma(u^{(m)})$. Thus, under the weighted interpolation of equation 14, the problem of finding all segments $S_m$ for which $\Gamma(u^{(m)})$ is below a certain threshold is equivalent approximately to the smaller, coarse problem of finding all $S_m$ for which $\Gamma^c(U^{(m)})$ is below half the same threshold.

Note that the resulting coarse problem is exactly of the same form as the original problem, and hence it can in turn be reduced using the same procedure to an equivalent, yet coarser problem of the same form. This recursive coarsening process is terminated when the number of variables is sufficiently small so that the problem can be solved directly for the coarsest grid.

There is one case in which a state variable cannot be approximated accurately by the state variables of its neighbors. This happens when a salient segment $S_m$ coincides at some scale with a single pixel i; i.e., $u_i^{(m)}=1$ while $u_j^{(m)}=0$ for $j \neq i$. (This, of course, would not happen usually at the original, finest level, but at coarser levels of the algorithm, where "pixels" are no longer original image pixels.) Consequently, if $i \notin C$, then the segment will no longer be represented at the coarser levels. But it is exactly at this point of the coarsening process that one can detect that $\Gamma(u^{(m)})$ is small, and hence, identify the salient $S_m$ in its natural size scale.

According to the invention the natural and useful way to interpret each coarsening step is as an aggregation step. In that view one chooses small aggregates of pixels, in terms of which the minimization problem can be reformulated with a substantially smaller number of variables. That is, enumerating the aggregates 1, 2, ..., K, and associating with the k-th aggregate a "block variable" $U_k$, and deriving from the original minimization problem a minimization problem in terms of $U_1, \ldots, U_k$. The coarse variables, in fact, do not have to be identified each with a particular pixel, during coarsening, but instead, they can be identified with weighted averages of pixels.

The interpolation rule that relates the coarse to the fine pixels, equation 5 (weighted interpolation) and equation 14 (weighted average coef.) leads to a process of weighted aggregation, in which a fraction $w_{ik}$ of a pixel i can be sent into the aggregate k. This fraction may be interpreted as the likelihood of the pixel i to belong to the aggregate k. These likelihoods will then accumulate and reinforce each other at each further coarsening step.

The choice of the coarser aggregates and the nature of this coarsening process is such that strongly coupled aggregates join together to form yet coarser aggregates. A set of pixels with strong internal couplings but with weak external couplings is bound to result at some level of coarsening in one aggregate which is weakly coupled to all other aggregates of that level. Such an aggregate will indicate the existence of an image segment.

The "coarse couplings" relations (Equation 7) can be somewhat simplified, yielding a similar coarsening process, named Iterated Weighted Aggregation (IWA). IWA consists of exactly the same steps as the AMG coarsening, except that the coarse couplings $\{A_{kl}\}$ are calculated by the simpler formula $$A_{kl} = \sum_{i \neq j} w_{ik} a_{ij} w_{jl}. \tag{15}$$

It can be shown that equation 15, coarse couplings (IWA) in many situations provides a good approximation to equation 7, coarse couplings (A). In certain cases the two processes are identical, e.g., in the case that each pixel is associated with only two blocks. Moreover, equation 15 (IWA) can be motivated by itself; it states that the coupling between two blocks is the sum of the couplings between the pixels associated with these blocks weighted appropriately.

Based on the foregoing concepts, the present invention comprises of a segmentation algorithm that is composed of two stages. In the first stage salient segments are detected and in the second stage the exact boundaries of the segments are determined. The rest of this section describes the two stages.

Referring to the first stage, detecting the Salient Segments, the method is described starting from a given image. Initially each pixel is considered to be a node connected to its four immediate neighbors. Then, coupling values are assigned between each pair of neighbors. The coupling values $a_{ij}$ are set to be $a_{ij}=\exp(-\mu r_{ij})$, where $\mu$ is a global parameter, and $r_{ij}$ is an "edgeness" measure between i and j. Specifically, for horizontally spaced neighbors i and j the presence of an edge was tested in five orientations at the angular range $-45° \leq \theta \leq 45°$ about the vertical direction, each by differentiating two 3×1 masks whose centers are placed on i and j. Then $r_{ij}$ is taken to be the maximal of the five responses.

Next, this graph is coarsened by performing iterated weighted aggregation. At each step of the coarsening block pixels are first selected and then the couplings between the blocks updated. Subsequently, a pyramidal structure is obtained that makes the optimal segments explicit.

In order to select the block pixels, first, the nodes (pixels) are ordered by the volume they represent. The nodes are sorted by bucketing to maintain linear runtime complexity. The first pixel is selected to be a block. Then, pixels are scanned according to this order and checked with respect to their degree of attachment, each to the previously selected blocks. Whenever a pixel is encountered that is weakly attached to the selected blocks, that pixel is added to the list of blocks.

Specifically, let $C^{(i-1)}$ denote the set of blocks selected before a pixel i is tested. The inequality is checked by the following $$\max_{j \in C^{(i-1)}} a_{ij} \geq \tilde{a} \sum_l a_{il}, \tag{16}$$

Note Where $\tilde{\alpha}$ is a parameter (typically $\tilde{\alpha}=0.1$). Note that since generally a node is connected to a small number of neighbors it must be coupled strongly to at least one of its neighbors. In case the inequality is satisfied, $C^{(i)}=C^{(i-1)}$ is set, otherwise $C^{(i)}=C^{(i-1)} \cup \{i\}$ is set. As a result of this process almost every pixel $i \notin C$ becomes strongly coupled to the pixels in C. The few remaining pixels are then added to C.

Next segmentation is effected. The couplings between the blocks are updated using equation 15 (coarse couplings, IWA), where the weights $w_{ik}$ are defined by equation 14 (weighted average coef.) In addition, the volume $\phi_k$ of each block is computed at this level using equation 9 (coarse Phi). Next, it is determined if a block represents a salient segment. The saliency of a segment is given by the ratio between the sum of its external couplings and its volume. When computing the saliency of a block, however, one needs to take into account that every coarsening step diminishes the external couplings of the segment by about a half. One can compensate for this reduction by multiplying this ratio by 2 to the power of the level number. Thus, the saliency of a block k becomes $$\Gamma(U_k) = \frac{\sum A_{kl}}{\Phi_k^\alpha} 2^\sigma,$$

where σ denotes the scale. Alternatively, one can use the volume of the block as a measure of scale, in which case one obtains $$\Gamma(U_k) = \frac{\sum A_{kl}}{\Phi_k^{\alpha-\gamma}},$$

where γ can be set between 0.5 to 1 according to the ratio of pixels that survive each coarsening step (0.25 to 0.5 respectively). In the implementation, the blocks of the same scale are simply compared and the ones whose saliency values are very low are detected. Then these blocks are allowed to participate in forming larger blocks to obtain a hierarchical decomposition of the image into segments.

There follows the technique for sharpening segment boundaries, During the first steps of the algorithm a salient segment is detected as a single element at some level of the pyramid. It remains then to determine exactly which pixels of the original image (at the finest level) in fact belong to that segment. One way to determine which pixels belong to a segment is to compute recursively the degree of attachment of every pixel to each of the blocks in the pyramid. Unfortunately, the degrees of attachment computed this way will often produce "fuzzy" values, between 0 to 1, particularly near the boundaries of a segment, rendering the decision of the extent of a segment somewhat arbitrary. To avoid this fuzziness the pyramid is scanned from coarse to fine starting at the level in which a segment is detected and relaxation sweeps applied whose intent is to sharpen the boundaries of a segment. In the following, one example of this step of the algorithm is described.

Suppose a segment $S_m$ has been detected, and suppose that at a certain level (which is called now the "coarse-level") it has been already determined which pixels belong to $S_m$. Now it is shown how to determine at the next finer level (called now the "fine level") which pixels belong to $S_m$. Using the same notation as before, the coarse level variables, $$\{U_k^{(m)}\}_{k=1}^K,$$

satisfy equation 12. Actually, along the boundaries of $S_m$ some $U_k^{(m)}$'s may assume values between 0 and 1. The task is to determine which pixels $$\{u_j^{(m)}\}_{j=1}^N$$

satisfy equation 1, but again allowing only pixels along the boundaries to obtain intermediate values between 0 and 1. Guided by the principle of minimizing $\Gamma(u^{(m)})$, a sharpening cycle consists of the following steps, iteratively changing $\tilde{u}^{(m)}$.

By fixing two parameters $0<\delta_1<\delta_2<1$ and defining $D_{x,y}$ to be the set of all pixels i such that $x<\tilde{u}_i^{(m)}<y$ at the beginning of the cycle. Then, modifying $\tilde{u}^{(m)}$ by setting $\tilde{u}_i^{(m)}=0$ for $i \in D_{0,\delta_1}$, setting $\tilde{u}_i^{(m)}=1$ for $i \in D_{\delta_2,1}$, and leaving $\tilde{u}_i^{(m)}$ unchanged for $i \in D_{\delta_1,\delta_2}$. This is followed by applying v "Gauss-Seidel relaxation sweeps" over $D_{\delta_1,\delta_2}$, where v is another free parameter. Each such "relaxation sweep" is a sequence of steps aimed at lowering $E(\tilde{u}^{(m)})$. In each sweep we go over all the pixels in $D_{\delta_1,\delta_2}$, in any order. For each pixel i, $\tilde{u}_i^{(m)}$ is replaced by the new value $\Sigma_j a_{ij} \tilde{u}_j^{(m)}/(\Sigma_j a_{ij})$, that is the value for which $E(\tilde{u}^{(m)})$ is lowered the most. Since the volume $V(\tilde{u}^{(m)})$ is only marginally affected also $\Gamma(\tilde{u}^{(m)})$ is lowered. Since in the beginning of this procedure already only pixels around the boundaries have fuzzy values (because this procedure has been applied to the coarser level) this relaxation procedure converges quickly. Hence, a small number of sweeps, v will generally suffice. In experiments two relaxation sweeps were applied in every level with, e.g., $\delta_1=1-\delta_2=0.15$ in the first cycle and $\delta_1=1-\delta_2=0.3$ in the second cycle. The final $\tilde{u}_i^{(m)}$ is defined as the desired vector $u^{(m)}$.

In the steps of the algorithm described above the couplings at all levels are derived directly from the couplings between the pixels at the finest level. However, since each element at a coarse level represents an aggregate of pixels, information about the emerging segments may be used that is not directly available at the finest level to facilitate the segmentation process. Thus "observables" can be measured at the coarse levels, and used to increase or decrease the couplings between blocks obtained with the original algorithm. An example, for such an observable is the average intensity of a block, which can be used to separate segments even when the transition between their intensity values is gradual, and so they are difficult to separate at the finest levels. The average intensity $G_k$ of a block k in the above coarsening step is defined as $$G_k = \Sigma_i w_{ik} g_i / \Sigma_i w_{ik},$$

where $g_i$ denotes the intensity of pixel i; This observable can be calculated recursively at all coarser levels. Then, the couplings $A_{kl}$ computed by equation 15 (coarse couplings IWA) may be replaced, e.g., by $A_{kl} \exp(-\mu|G_k-G_l|)$, where μ is a predetermined constant.

The number of observables per aggregate can increase at coarser levels. Other possible observables include the center of mass of a block, its diameter, principal orientations, texture measures, etc. Using these observables it is possible to incorporate quite elaborate criteria into the segmentation process. For example, strong couplings can be assigned between two aggregates whose orientations align with the direction of the line connecting their centers of mass (or when their boundaries co-align), even when these aggregates are separated by a gap and thus do not inherit any mutual couplings from finer levels.

Similarly (and perhaps more important), very strong couplings could be attributed between two horizontally neighbors aggregates whose "upper-weighted-average" boundary directions coincide. Using the above boundary sharpening procedure on any large-scale aggregate with proper parameters the boundary direction of any part of the boundary will come out well defined. For each of the two aggregates, in the upper-weighted-average of these directions, larger weights will be assigned in regions closer to the upper side of the other aggregate, except that zero weights will used along their "common" boundary (properly defined).

At every coarsening step a subset of the nodes is selected such that the remaining nodes are coupled strongly to at least one of the nodes. Following this selection procedure almost no two neighboring nodes can survive to the next level. Thus, at every level of scale about half the nodes are obtained from the previous level. The total number of nodes in all levels, therefore, is about twice the number of pixels.

During the selection procedure there are two operations whose naive implementation may result in a nonlinear complexity. First, the nodes need to be ordered, say, according to their volumes. This can be done in linear time by dividing the range of possible volumes into a fixed number of buckets since it is unnecessary to sort nodes whose volumes are similar. Furthermore, in the first few levels the nodes usually have similar volumes, and so this ordering do not need to be applied. Instead, merely scanning the nodes in some arbitrary order can be done. Secondly, for every node its maximal connection to the selected blocks must be found, see equation 16 (coarse item max dependence). This operation can be implemented efficiently by noticing that every node need only to consider its neighboring nodes, typically up to 8 nodes. Finally, computing the degree of attachment of the pixels to all the block variables can be done in one pass once the pyramid is complete.

The number of operations per pixel can be reduced significantly by replacing the first 1-3 coarsening steps by equivalent geometric coarsening. In these coarsening steps the same operations are performed, but the pixels selected as blocks are determined in advance to lie along a regular grid of twice the mesh size. (This may require adding some of the fine pixels to the coarse set to avoid inaccurate interpolations.) With this modification it is possible to reduce the execution time of the algorithm to only several dozen operations per pixel.

Examples of segmentation obtained using the method and apparatus of the present invention including implementation of the algorithm are described in the following. The implementation was not optimized, and, for example, did not include geometric coarsening to reduce the number of operations per pixels. The implementation (written in C and run on an Intel 400 MHz Pentium II processor) took 60 seconds to segment a 200×200 image. The pyramid produced in this run contained about 73000 nodes (less than twice the number of pixels.) Segmenting a 100×100 image took only 12 seconds.

The pictures illustrated in the Figures of the drawings demonstrate the application of method and apparatus of the first embodiment of the invention including the algorithm to several real images. FIGS. 1a to 1d show baseball players in action. The input image is FIG. 1a. At the top most scale, FIG. 1b, the picture was divided into two segments. At scale 8, FIG. 1c, five segments stood out, two capturing most of the bodies of the two players, one captures the hand of one of the players, and one captures the head of the other. At scale 7, FIG. 1d, smaller segments are obtained, separating some of the body parts of the two players.

Figure 2A:
FIG. 2a shows an input image.
Figure 2B:
FIG. 2b shows the input image decomposed at level 10 into four segments, one of which captures the lioness depicted.
Figure 2C:
FIG. 2c shows the bottom segment further decomposed at level 8 into three segments, splitting the cub and stone from the ground.
Figure 3A:
FIG. 3a shows an input image.
Figure 3B:
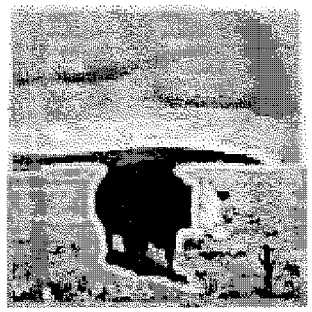
FIG. 3b shows the image decomposed into three segments obtained at scale 10, capturing the skies, the grass, and a single segment that includes the cow and the hilly background.
Figure 3C:
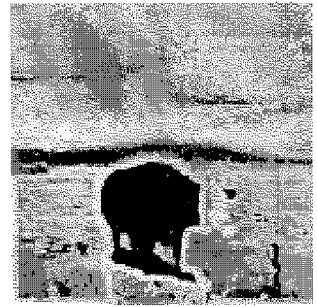
FIG. 3c shows at scale 9 the cow separated from the hills, and the grass split into two segments.
Figure 4A:
FIG. 4a shows an input image.
Figure 4B:
FIG. 4b shows at the coarsest scale the grass separated from the cows (except for the bright back of the cow which was decomposed later from the grass)
Figure 4C:
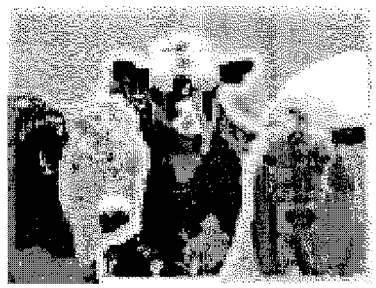
FIG. 4c shows the three cows then split (with the rightmost cow split into two segments)
Figure 4D:
FIG. 4d shows the body parts of the cows obtained in the lower scale.

FIGS. 2a to 2c show a lioness, original image FIG. 2a, that was decomposed at level 10, FIG. 2b, into four segments, one of which captures the lioness. At level 8, FIG. 2c, the bottom segment was further decomposed into three segments, splitting the cub and the stone from the ground. FIGS. 3a to 3c show a cow standing in a field. FIG. 3a is the input image. FIG. 3b shows the three segments obtained at scale 10, capturing the skies, the grass, and a single segment that includes the cow and the hilly background. At scale 9, FIG. 3c, the cow was separated from the hills, and the grass was split into two segments. FIGS. 4a to 4c show three cows (FIG. 4a being the original input image). At the coarsest scale, FIG. 4b, the grass was separated from the cows (except for the bright back of the rightmost cow which was decomposed later from the grass). The three cows were then split, FIG. 4c, (with the rightmost cow split into two segments). Body parts of the cows are obtained in the lower scale, FIG. 4d. Overall, these pictures demonstrate that the invention including the algorithm accurately finds the relevant regions in the images.

As described above, the method and apparatus of the invention provides a way to deal with data clustering and more particularly, provides a fast, multiscale algorithm for image segmentation. The algorithm uses a process of recursive weighted aggregation to detect the distinctive segments at different scales. It finds an approximate solution to normalized cuts measure in time that is linear in the size of the image with only a few dozen operations per pixel. The interpolation weights, see equation 14 can be improved, yielding a better approximation of the fine level minimization problem by the coarser representations and allowing representing the coarser problems with fewer block pixels.

Ideally, the interpolation rule equation 5, should yield a fine-level configuration u that satisfies the energy-minimization condition $\partial E(u)/\partial u_i = 0$. Since E is quadratic in u this condition can be written as $$u_i^{(m)} = \sum_{j \in C} \hat{a}_{ij} u_j^{(m)} + \sum_{j \notin C} \hat{a}_{ij} u_j^{(m)}, \qquad (17)$$

where $\hat{a}_{ij}$ are the normalized couplings, defined by $$\hat{a}_{ij} = a_{ij} / \sum_l a_{il}.$$

Notice that the interpolation rule considers only the first terms in equation 17. Given any non-ideal interpolation weights $\{w_{ik}\}$, improved interpolation weights $\{\overline{w}_{ik}\}$ are given by $$\overline{w}_{ik} = \hat{a}_{ic_k} + \sum_{j \notin C} \hat{a}_{ij} w_{jk}. \qquad (18)$$

This same rule can recursively be reused several time, to create increasingly improved interpolation weights.

A measure of the "deficiency" $d_i$ of interpolating to pixel i with the interpolation weights, see equation 14, is defined as the relative part of equation 17 being ignored by the relation, see equation 14, i.e., $$d_i = \Sigma_{j \notin C} \hat{a}_{ij}.$$

Similarly, given any interpolation weights $\{w_{ik}\}$ with deficiencies $\{d_i\}$, the improved interpolation weights $\{\overline{w}_{ik}\}$ created by equation 18 will have the deficiencies $$\overline{d}_i = \Sigma_{j \notin C} \hat{a}_{ij} d_j.$$

Hence, with reasonably dense set C, the deficiencies will be much reduced with each improvement, so that normally very few such improvements (if at all) would be needed.

With the improved interpolation weights, see equation 18, the coarse-variable selection criterion, equation 11, can be relaxed, replacing it by the more general criterion $d_i \leq 1-\beta$. Condition coarse item max dependence, equation 16, can similarly be relaxed.

Also, for computational efficiency it is desired to keep the interpolation matrix $\{w_{ik}\}$ as sparse (containing as few non-zero terms) as possible. This is accomplished by replacing small weights ($w_{ik} < \xi$, $\xi$, being another algorithm-control parameter; e.g., $\xi=0.01$) by zeros, and then renormalize to maintain $$\Sigma_k w_{ik} = 1.$$

Now the second specific embodiment will be described in detail. As explained above, image segmentation is difficult because objects may differ from their background by any of a variety of properties that can be observed in some, but often not all scales. A further complication is that coarse measurements, applied to the image for detecting these properties, often average over properties of neighboring segments, making it difficult to separate the segments and to reliably detect their boundaries. The method and apparatus for segmentation generates and combines multiscale measurements of intensity contrast, texture differences, and boundary integrity. The method is based on the method and apparatus described above utilizing an algorithm for segment weighted aggregation (SWA), which efficiently detects segments that optimize a normalized-cut-like measure by recursively coarsening a graph reflecting similarities between intensities of neighboring pixels. In this invention aggregates of pixels of increasing size are gradually collected to form segments. While doing so, properties of the aggregates are computed and the graph is modified to reflect these coarse scale measurements. This allows detecting regions that differ by fine as well as coarse properties, and to accurately locate their boundaries. Furthermore, by combining intensity differences with measures of boundary integrity across neighboring aggregates regions separated by weak, yet consistent edges can be detected.

As noted above, image segmentation methods divide the image into regions of coherent properties in an attempt to identify objects and their parts without the use of a model of the objects. In spite of many thoughtful attempts, finding a method that can produce satisfactory segments in a large variety of natural images has remained difficult. In part, this may be due to the complexity of images. Regions of interest may differ from surrounding regions by any of a variety of properties, and these differences can be observed in some, but often not in all scales. In the following, an improved method and apparatus for segmentation utilizing an improved algorithm will be described. This improvement is based on the foregoing disclosure regarding segmentation. Like the foregoing, in the improved invention a multiscale structure is built to measure and incorporate various properties such as intensity contrast, isotropic texture, and boundary integrity. This results in an efficient method and apparatus that detects useful segments in a large variety of natural images.

Segments that differ by coarse scale properties introduce a specific difficulty to the segmentation process. Since initially one does not know the division of the image into segments, any coarse measurement must rely on an arbitrarily chosen set of pixels ("support") that may often include pixels from two or more segments, particularly near the boundaries of segments. This may lead to significant over-smoothing of the measured properties and to blurring the contrast between segments, inevitably leading to inaccuracies in the segmentation process. On the other hand, since segments often differ only by coarse scale properties, such segments cannot be detected unless coarse measurements are made.

The improved method and apparatus solve this "chicken and egg problem." It does so by building a pyramid structure over the image. The structure of the pyramid is determined by the content of the image. As the pyramid is constructed from bottom to top, segment fragments of increasing size are detected. These fragments are used as a support area for measuring coarse scale properties. The new properties are then used to further influence the construction of larger fragments (and eventually whole segments). By measuring properties over fragments, this avoids the over-smoothing of coarse measurements (as can be seen in FIG. 5, and so segments that differ in coarse scale properties usually stand out. Experiments demonstrate a considerable improvement over existing approaches. The process is very efficient. The runtime complexity of the algorithm is linear in the size of the image. As the pyramid is constructed segment properties are computed recursively through integrals over the support area. The implementation (whose run-time may still be significantly reduced) applied to an image of 200×200 pixels takes about 5 seconds on a Pentium III laptop.

The method uses the segmentation by weighted aggregation (SWA) as a framework. This algorithm uses techniques from algebraic multigrid to find the segments in the image. Like other recent segmentation algorithms, the method optimizes a global measure, a normalized-cut type function, to evaluate the saliency of a segment. To optimize the measure, the algorithm builds an irregular pyramid structure over the image. The pyramids maintains fuzzy relations between nodes in successive levels. These fuzzy relations allow the algorithm to avoid local decisions and detect segments based on a global saliency measure.

Pyramids constructed over the image have been used for solving many problems in computer vision. Typically, the image is sampled at various scales and a bank of filters is applied to each sampling. Segmentation is generally obtained by going down the pyramid and performing split operations. Subsequent merge operations are applied to reduce the effect of over-segmentation. Over-smoothing introduces a serious challenge to these methods. A different kind of pyramid structure is built by agglomerative processes, however these processes, are subject to local, premature decisions.

Other approaches that attempt to reduce the problem of over-smoothing include the use of directional smoothing operators for multiscale edge detection. These operators are local and require an additional process for inferring global segments. Also of relevance are methods for smoothing using unisotropic diffusion. These methods avoid over-smoothing, but typically involve a slow, iterative process that is usually performed in a single scale.

The foregoing reviewed the SWA Algorithm, and described how to combine properties that involve integral measures over a segment in the segmentation process. With two measures, the average intensity of a segment and its variance across scale was demonstrated. Also, in the foregoing boundaries in the segmentation process were discussed. Finally, in the experiments given above, it was shown that the invention performed efficiently.

As discussed above, in the efficient multiscale algorithm for image segmentation, a 4-connected graph $G=(V,E,W)$ is constructed from the image, where each node $v_i \epsilon V$ represents a pixel, every edge $e_{ij} \epsilon E$ connects a pair of neighboring pixels, and a weight $w_{ij}$ is associated with each edge reflecting the contrast in the corresponding location in the image.

The algorithm detects the segments by finding the cuts that approximately minimize a normalized-cut-like measure. This is achieved through a recursive process of weighted aggregation, which induces a pyramid structure over the image. This pyramid structure is used in this invention to define geometric support for coarse scale measurements, which are then used to facilitate the segmentation process.

Two slight modifications (improvements) are made to the SWA algorithm relative to its original implementation as described above. First, the normalization term in the optimization measure is changed, normalizing the cost of a cut by the sum of the internal weights of a segment, rather than by its area. Secondly, the graph is initialized with weights that directly reflect the intensity difference between neighboring pixels, rather than using "edgeness measure" defined previously. Specifically, $w_{ij}=\exp(-\alpha|I_i-I_j|)$, where $I_i$ and $I_j$ denote the intensities in two neighboring pixels i and j, and $\alpha>0$ is a constant.

The SWA algorithm proceeds as follows. With every segment $S=\{s_1, s_2, \ldots, s_m\} \subseteq V$, a state vector $u=(u_1, u_2, \ldots, u_n)$ $(n=\|V\|)$, is associated where $$u_i = \begin{cases} 1 & \text{if } i \in S \\ 0 & \text{if } i \notin S \end{cases}. \tag{1}$$

The cut associated with S is defined to be $$E(S) = \sum_{i \neq j} w_{ij}(u_i - u_j)^2, \tag{2}$$

and the internal weights are defined by $$N(S) = \Sigma w_{ij} u_i u_j. \tag{3}$$

The segments that yield small (and locally minimal) values for the functional $$\Gamma(S) = E(S)/N^\beta(S), \tag{4}$$

for a predetermined constant $\beta>0$, and whose volume is less than half the size of the image, are considered salient.

The objective of the algorithm is to find the salient segments. To this end a fast transformation for coarsening the graph was introduced. This transformation produces a coarser graph with about half the number of nodes (variables), and such that salient segments in the coarse graph can be used to compute salient segments in the fine graph using local processing only. This coarsening process is repeated recursively to produce a full pyramid structure. The salient segments emerge in this process as they are represented by single nodes at some level in the pyramid. The support of each segment can then be deduced by projecting the state vector of the segment to the finest level. This segmentation process is run in time that is linear in the number of pixels in the image.

The coarsening procedure proceeds recursively as follows. It begins with $G^{[0]}=G$. (The superscript denotes the level of scale.) Given a graph $G^{[s-1]}$, a set of coarse representative nodes $C \subseteq V^{[s-1]} = \{1, 2, \ldots, n\}$ is chosen, so that every node in $V^{[s-1]} \setminus C$ is strongly connected to C. A node is considered strongly connected to C if the sum of its weights to nodes in C is a significant proportion of its weights to nodes outside C. Assume, without loss of generality, that $C=\{1, 2, \ldots, N\}$. A coarser state vector $u^{[s]}=\{u_1^{[s]}, u_2^{[s]}, \ldots, u_N^{[s]}\}$ is now associated with C, so that $u_k^{[s]}$ denotes the state of the node k. Because the original graph is local, and because every node is strongly connected to C, there exists a sparse interpolation matrix $P^{[s-1,s]}$, with $$E_k P_{ik}^{[s-1,s]} = 1$$

for every i, that satisfies the following condition. Given $u^{[s]}$ for any salient segment S, the state vector $u^{[s-1]}$ associated with that segment is approximated well by the inter-scale interpolation $$u^{[s-1]} \approx P^{[s-1,s]} u^{[s]}. \tag{5}$$

$\{p_{ik}^{[s-1,s]}\}_{k=1}^N$ are chosen to be proportional to $$\{w_{ik}^{(m)}\}_{k=1}^N$$

for any i∉C, and $$p_{ii}^{[s-1,s]} = 1$$

for i∈C.

Every node k∈C can be thought of as representing an aggregate of pixels. For s=1, for example, a pixel i belongs to the k-th aggregate with weight $$p_{ik}^{[0,1]}.$$

Hence, a decomposition of the image into aggregates can be obtained. Note that by the definition of $P^{[s-1,s]}$ aggregates will generally not include pixels from both sides of a sharp transition in the intensity. In the absence of such a sharp transition a pixel will typically belong to several surrounding aggregates with weights proportional to its coupling to the representative of each aggregate.

Only later, as information from much coarser levels joins in, will sharper membership of such pixels to aggregates or segments increasingly emerge. This is unlike agglomerative techniques, where pixels are definitely joined together based only on quite local information, which is often not reliable enough.

Equation 5 (Coarse-To-Fine) is used to generate a coarse graph $G^{[s]}=(V^{[s]}, E^{[s]}, W^{[s]})$, which is associated with the state vector $u^{[s]}$, where $V^{[s]}$ corresponds to the set of aggregates $(1, 2, \ldots, N)$, and the weights in $W^{[s]}$ are given by the "weighted aggregation" relation $$w_{kl}^{[s]} = \sum_{i \neq j} P_{ik}^{[s-1,s]} w_{ij}^{[s-1]} P_{jl}^{[s-1,s]} + \delta_{kl} \sum_i P_{ik}^{[s-1]} w_{ii}^{[s-1]}, \tag{6}$$

where $\delta_{kl}$ is the Kronecker delta. (The second term in this expression influences only the computation of the internal weight of an aggregate, and its role is to recursively accumulate those weights.) Finally, we define an edge $$e_{kl}^{[s]} \in E^{[s]}$$

if and only if k≠l and $w_k^{[s]}$≠0. The coarse graph $G^{[s]}$ can be partitioned according to relations like equations 1-4 applied to the coarse state vector $u^{[s]}$, except that the internal weight, equation 3, should now take into account also the internal weights of the aggregates; so that $w_{kk}$ is generally not zero, and its value can be computed recursively using equation 6.

At the end of this process a full pyramid has been constructed. Every salient segment appears as an aggregate in some level of the pyramid. Therefore evaluation of the saliency of every node occurs, and then a top-down process applied to determine the location in the image of the salient ones. This is achieved for every segment by interpolating $u^{[s]}$ from the level at which the segment was detected downward to the finest, pixel level using equation 5. Sharpening sweeps are applied after interpolation at each level to determine the boundaries of the segment more accurately as described below.

The objective now is to use the pyramidal structure created by the SWA algorithm in order to define the support regions for coarse measurements and to use these measurements to affect the constructed pyramid. There are two versions to this algorithm. In one version the coarse measurements affect only the construction of yet coarser levels in the pyramid. In the second version we also use the coarse measurements are used to also affect lower levels of the pyramid. This will be explained subsequently. Without top-down processing the algorithm proceeds as follows. At each step is constructed a new level in the pyramid according to the process described previously. For every node in this new level then compute properties of the, aggregate it represents. Finally, for every edge in this graph update the weights to account for the properties measured in this level. This will affect the construction of the pyramid in the next levels.

Certain useful properties of regions are expressed through integrals over the regions. Such are, for example, statistics over the regions. Such properties are also easy to handle with the novel algorithm, since they can be computed recursively with the construction of the pyramid. With such measurements the overall linear complexity of the segmentation process is maintained. Below are examples of two such measures. The first measure is the average intensity of the regions. The average intensity allows segmenting regions whose boundaries are characterized by a gradual transition of the intensity level. This measure was discussed above The second, more elaborate measure is the variances of regions. The variance of regions are collected in every scale with comparing of the set of variances obtained for neighboring aggregates. This allows accounting for isotropic textures characterized by their second order statistics. As will be evident from experiments, this already allows handling pictures that include textured segments. The full future treatment of texture will require additional measurements that are sensitive to directional texture and perhaps to higher order statistics of segments.

Below is described the two measurements and their use in the segmentation process. First, some notation. The matrix $$P^{[t,s]} = \prod_{q=t}^{s-1} P^{[q,q+1]} \quad (7)$$

describes the interpolation relations between a scale t and a scale s, 0≤t<s. Thus, $$P_{ik}^{[t,s]}$$

measures the degree that the aggregate i of scale t belongs to the aggregate k of scale s.

Suppose $Q_l^{[t]}$ is an integral of a function over the aggregate l at scale t. Then, one can recursively compute the integral of that function over an aggregate k in any scale s>t by $$Q_k^{[t,s]} = \sum_l P_{lk}^{[t,s]} Q_l^{[t]}. \quad (8)$$

Using equation 7, this integral can be computed level by level by setting t=s−1 in equation 8. The average of $Q_k^{[t,s]}$ over the aggregate k can also be computed by $$\overline{Q}_k^{[t,s]} = Q_k^{[t,s]} / P_k^{[t,s]}, \quad (9)$$

where $$P_k^{[t,s]} = \sum_l P_{lk}^{[t,s]},$$

the volume of the aggregate k at scale s is given in units of aggregates at scale t, can also be computed recursively. In particular, $$p_k^{[0,s]}$$

is the volume of the aggregate k at scale s in pixels.

Measuring the average intensity of a region is useful for detecting regions whose intensity falls off gradually near the boundary, or when the boundary is noisy. Let $\mu_k^{[s]}$ denote the average intensity of the aggregate k at scale s. Equations 8 and 9 can be used to compute recursively $\mu_k^{[s]}$ starting with $Q_i^{[0]} = I_i$.

In the construction of a new level s the weights $w_k^{[s]}$ are generated according to equation 6 using the fine-scale weights. Modify $w_k^{[s]}$ to account also for intensity contrast between the aggregates k and l by multiplying it by $$e^{-\alpha_s |\mu_k^{[s]} - \mu_l^{[s]}|}.$$

This parameter, $\alpha_s$ can be tuned to prefer certain scales over others, say, according to prior knowledge of the image. In the implementation it is set $$\alpha_s \equiv \tilde{\alpha}$$

for a fixed $\tilde{\alpha} > 0$. As a result of this modification, the subsequent construction of the coarser levels of the pyramid is affected by the contrast at level s and at all finer scales. This enables detection of significant intensity transitions seen at any level of scale.

The variance of image patches is a common statistical measure used to measure texture. Variance is useful in characterizing isotropic surface elements. Additional statistics are often used to characterize more elaborate textures. In the present invention, the average variances at all finer scales is used to relate between aggregates. Other statistics can be incorporated as a step in the method in a similar way.

To compute the variance of an aggregate according to the present invention, the average squared intensity of any aggregate k at any scale s is accumulated denoted by $$\overline{I^2}_k^{[s]}.$$

This too is done recursively starting with $Q_i^{[0]} = I_i^2$. The variance of an aggregate k at a scale s is then given by $$v_k^{[s]} = \overline{I^2}_k^{[s]} - (\mu_k^{[s]})^2.$$

By itself, the variance of an aggregate measured with respect to its pixels provides only little information about texture. Additional information characterizing the texture in an aggregate can be obtained by measuring the average variance of its sub-aggregates. This is denoted by $$\overline{v}_k^{[t,s]},$$

the averages of $v_i^{[t]}$ over all the sub-aggregates of k of scale t (t<s).

$$\overline{v}_k^{[t,s]}$$

can be compute recursively, beginning at scale t by setting $Q_i^{[t]} = v_i^{[t]}$ in equation 8. The multiscale variance associated with an aggregate k in scale s, then, is described by the vector $$\vec{v}_k^{[t,s]} = (\overline{v}_k^{[1,s]}, \overline{v}_k^{2,s}, \ldots, \overline{v}_k^{[s-1,s]}, v_k^{[s]}).$$

In the construction of a level s in the pyramid the multiscale variance vector is used to modify the weights in the graph $G^{[s]}$. For every pair of connected nodes k and l in $V^{[s]}$, $$w_{kl}^{[s]}$$

is multiplied by $$e^{-\beta_s D_{kl}^{[s]}},$$

where $$D_{kl}^{[s]}$$

is the Mahalanobis distance between $\vec{v}_k^{[s]}$ and $\vec{v}_l^{[s]}$, which can be set so as to prefer certain scales over others. In general, these modifications are performed only from a certain scale T and up. This enabled accumulation of aggregates of sufficient size that contain rich textures.

The multiscale variance of an aggregate can detect isotropic texture. To account for non-isotropic texture one may aggregate recursively the covariance matrix of each aggregate, and use it to infer its principal axis indicating its direction and oblongness. By computing statistics of the direction and oblongness of sub-aggregates at every finer scale, a multiscale description can be obtained of the texture pattern in the aggregate.

Smooth continuation of boundaries is a strong cue that often indicates the presence of a single object on one side of the boundary. In the present invention this cue is used to facilitate the segmentation process. In this regard, the method proceeds as follows. During the construction of the pyramid, for every aggregate, sharp (as opposed to blurry) sections of its boundary are identified. Then, every two neighboring aggregates are compared and determined whether they can be connected with a smooth curve. If a clear smooth continuation is found, then, the weight between the aggregates is increased. Consequently, such two aggregates are more likely to be merged in the next level of the pyramid even when there is variation in their intensities.

Identifying the boundaries of an aggregate requires top-down processing of the pyramid. At each level of the pyramid, for every aggregate in that level, the sharp sections of its boundary are determined by looking at its sub-aggregates several levels down the pyramid. In general, the method goes down a constant or fixed number of levels keeping the resolution of the boundaries proportional to the size of the aggregate. This will somewhat increase the total runtime of the algorithm, but the asymptotic complexity will remain linear. The effort is worth the extra cost, since boundary cues can help avoiding the over-fragmentation of images, which is a common problem in many segmentation algorithms.

The fact that the method only considers boundary completion between neighboring aggregates, allows consideration of only candidates that are likely to produce segment boundaries and cuts down the combinatorics that stalls perceptual grouping algorithms. This has two important consequences. First, it keeps the overall complexity of the segmentation process low. Secondly, it eliminates candidates that may produce smooth continuations, but otherwise are inconsistent with the segments in the image. This simplifies the decisions made by the segmentation process and generally leads to more accurate segmentation. It should be noted, however, that the boundary process of the inventive method is intended to facilitate the segmentation process and not to deal with pictures that contain long subjective contours as most perceptual grouping algorithms do.

Before explaining the details of how boundaries are used in the segmentation method, one, important step in the extraction of boundaries will be explained. This is a top-down step whose purpose is to make the boundaries of an aggregate in the pyramid sharper.

Every time a new level in the pyramid is constructed, also, a process of top-down sharpening of the boundaries of aggregates is performed by readjusting the weights two levels down and then, updating the higher levels according to these adjustments. The reason for this step is as follows. Recall that every level of the pyramid is constructed by choosing representative nodes from the previous levels. Thus, every aggregate in a level s is identified with a single sub-aggregate in the preceding level s−1. This sub-aggregate belongs to the coarser aggregate with interpolation weight 1 (see equation 5). By recursion, this means that the aggregate of level s is identified with a single pixel in the image. As the pyramid is coarsened, this may introduce a bias since pixels in the aggregate that are far from the representative pixels may be weakly related to the aggregate merely because of their distance from the representative pixel. To remedy this, a top-down sharpening step or procedure is performed in which for every aggregate, nodes are identified in the lower levels that clearly belong to the aggregate. Then, the interpolation weight for such nodes is increased considerably. This results in extending the number of pixels that are fully identified with the segment, and as a consequence in restricting the fuzzy transitions to the boundaries of a segment.

The step or procedure of sharpening is performed as follows. Consider an aggregate k at scale s. The aggregate is associated with the state vector $u^{[s]}$ by assigning 1 at its k-th position and 0 elsewhere. Equation 5 tells how each node of scale s−1 depends on k. Considering the obtained state vector $u^{[s-1]}$, define a modified vector $\tilde{u}^{[s-1]}$ is defined by $$\tilde{u}_i^{[s-1]} = \begin{cases} 1 & \text{if} \quad u_i > 1 - \delta_2 \\ u_i & \text{if} \quad \delta_1 \le u_i \le 1 - \delta_2 \\ 0 & \text{if} \quad u_i < \delta_1 \end{cases} \quad (10)$$

for some choice of $0 \le \delta_1, \delta_2 \le 1$. One recommended choice is to use $\delta_1 = \delta_2 = 0.2$. This process is repeated recursively using $\tilde{u}^{[s-1]}$ until a scale t is reached (typically t=s−2). Once t is reached, the obtained state vector $\tilde{u}^{[t]}$ is looked at. For every pair of nodes i and j at scale t for which $\tilde{u}_i^{[t]} = \tilde{u}_j^{[t]} = 1$ the weight is doubled between the nodes. This will make those nodes belong to the aggregate much more strongly than the rest of the nodes. This step, procedure or process is repeated for every aggregate at scale s obtaining a new weight matrix $W^{[t]}$.

Using the new weight matrix $W^{[t]}$, the pyramid is rebuilt from levels t+1 and up. This in effect will modify, the Interpolation matrices and the weights at the coarser levels. As a result a sharper distinction is obtained between the aggregates, where coarse level measurements affect our interpretation of the image in finer scales.

A similar mechanism was used in the procedures first described above as a post-processing stage to determine the boundaries of salient segments in the image. In this improved method, this procedure is applied throughout the bottom-up pyramid construction. As a consequence coarse measurements influence the detection of segments already at fine scales.

Next it is explained how boundaries facilitate the segmentation method. Given an aggregate k at scale s (denoted by S), this step begins again with the characteristic state vector $u^{[s]}$ by assigning 1 to $u^{[s]}$ at the k-th position and 0 elsewhere. The procedure described in sharpening a constant number of levels l down the pyramid to obtain the corresponding state vector $\tilde{u}^{[s-l]}$. Since every variable $u_i^{[s-l]}$ is associated with a pixel in the image, this vector indicates which of the corresponding pixels belong to S and by what degree. Hence, there is a (non-uniform) sampling of image pixels $\tilde{u}^{[s-l]}$, with their degree of belonging to S. The scale s−l determines the density of the sampling. The lower this scale is (larger l), the smaller are the corresponding aggregates and, hence, the denser are the corresponding pixels in the image. The state vector is treated as an image, with values assigned only to the pixels $\tilde{u}^{[s-l]}$. Pixels with high values in $\tilde{u}^{[s-l]}$, belong to S, whereas pixels with low value belong outside S. Then, sharp boundaries in this image are sought, at the resolution imposed by the density of the pixels $\tilde{u}^{[s-l]}$, by looking for sharp transitions in the values of these pixels.

To locate the boundaries, for each pixel in $\tilde{u}^{[s-l]}$, its difference is measured from the average value of its neighbors (also in $\tilde{u}^{[s-l]}$). That is, for example, applying a Marr and Hildreth-like operator to only the pixels of $\tilde{u}^{[s-l]}$. The resulting values are threshholded to obtain edge pixels. This step is followed by a step of edge tracing in which line segments are best fit (in the $l_2$-norm sense) to the edge pixels. Finally, a polygonal approximation is produced of the aggregate boundary. The line segments obtained in this process are in fact oriented vectors; we maintain a clockwise orientation is maintained by keeping track of the direction to the inside of the aggregate. The size of the aggregate determines the density of the edge pixels. Note that the edges obtained may be fragmented; gaps may still be filled in at a coarser scale. The total complexity of the algorithm remains linear because during the process of boundary extraction descent only occurs a constant number of levels and the number of pixels accessed falls down exponentially as one climbs higher in the pyramid.

Repeating for each aggregate k at scale s the top-down interpolation process described above, there is no need in going all the way down to the finest scale. It is enough to go down the levels only a constant number of scales l like described above, obtaining the corresponding state vector $\tilde{u}^{[t]}$, t=s−l. Since every variable $u_i^{[t]}$ is associated with a pixel in the image a generalized Marr-Hildreth-like operator may be applied to those pixels according to their neighboring relations in the image. From this is derived a polygonal approximation to the aggregate's sharp boundary sections. In this top-down interpolation process every aggregate is described at scale t by a fixed number of pixels (set by l). Since the number of aggregates is reduced with scale by roughly a constant factor, the method remains with a linear complexity of the algorithm.

After the method determines the boundaries of each aggregate in the level s, the method examines every two neighboring aggregates to determine whether their boundaries form a smooth continuation. To this end a step is employed to first sort the vectors obtained for each aggregate according to their orientation (from 0 to $2\pi$). Then, for every two aggregates the method can quickly identify pairs of vectors of similar orientation by merging the two lists of sorted vectors. The method then matches two vectors if they satisfy three conditions: (1) they form a good continuation, (2) the two corresponding aggregates have relatively similar properties (e.g., intensity and variance), and (3) no other vector of the same aggregate forms a better continuation. The last condition is used to eliminate accidental continuations that appear as Y-junctions.} To evaluate whether two vectors form a good continuation, the improved method uses the measure proposed below.

In a specific example of the measure noted above, an elastica measure is employed that penalizes deviations from smoothness, but takes into account in addition the lengths of the two vectors. The measure is a product of two exponents, one that penalizes for the distance r between the two vectors, and the other that penalizes for the angular difference between them. In these expressions the angles that the two vectors form with the line connecting their centers is taken into consideration, and the lengths and widths of the vectors. In the current implementation of the method only vectors of width 1 are considered, but the width may be changed. Allowing for larger values will handle also thick edges. This measure allows long vectors to connect over larger gaps, but penalizes them more severely if they change their orientations.

If a pair of vectors are found that form a good continuation according to this measure, the weight is increased between the two aggregates to become equal to their highest weight to any other node. This way the system is encouraged to merge the two aggregates in the next level of the pyramid. One can of course consider to moderate this intervention in the process to balance differently between boundary integrity and other properties.

As with the variances these steps are applied from some level T and up, so that the aggregates are large enough to form significantly long boundaries.

The process of boundary completion can be extended to detect a-modal completions. To this end remote aggregates may be compared and the weights between them be increased if (1) after completion their boundaries can be connected smoothly, and (2) they are separated by a salient (foreground) segment. This step is referred to as "topological subtraction of detected foreground segments."

The method and apparatus of the present invention has been tested on various natural images. Shown in FIGS. 5-12 are a few examples. To get a sense of the advantages of the inventive method two other algorithms were applied to the same images for comparison purposes. First, the SWA algorithm described above was tested to demonstrate the enhancements achieved by incorporating additional coarse measurements. This implementation used a 4-connected graph, but incorporates only coarse scale average-intensity measures, in a manner similar to that described regarding average Intensity. In addition, an implementation of the known normalized cuts algorithm was tested, In this implementation a graph is used in which every node is connected to nodes up to a radius of 30 pixels. The algorithm combines intensity, texture and contour measurements. In both cases original software written for these algorithms was used. Due to the large number of parameters, the tests were limited regarding the variety of settings. However, it is believed that the results obtained in all cases are fairly typical to the performance that can be obtained with the algorithms.

Figure 5A:
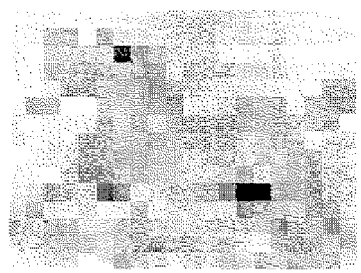
Figure 5B:
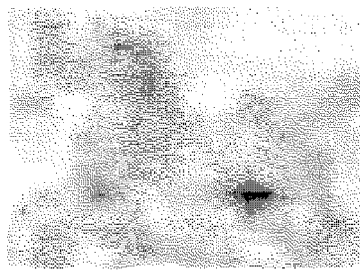
Figure 5C:
Figure 5D:
Figure 6A:
FIGS. 6a to d show in FIG. 6a the original input image, in FIG. 6b the result of the method of the present invention, in FIG. 6c the result of the application of the SWA and in FIG. 6d the result of the prior art (the so called "normalized-cuts"—spectral method).
Figure 6B:
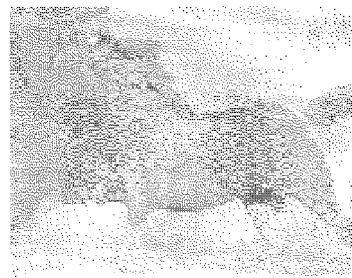
Figure 6C:
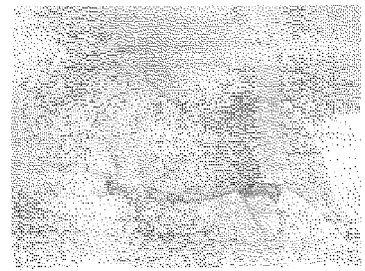
Figure 6D:
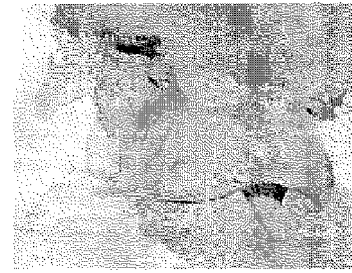
Figure 7A:
FIGS. 7a to d show in FIG. 7a an original input image, in FIG. 7b the result of the application of the present invention, in FIG. 7c the application of the SWA and in FIG. 7d the result of the prior art (the so called "normalized-cuts"—spectral method).
Figure 7B:
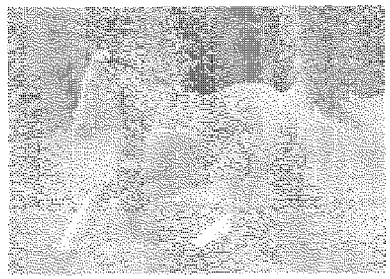
Figure 7C:
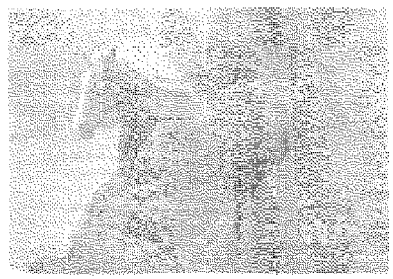
Figure 7D:
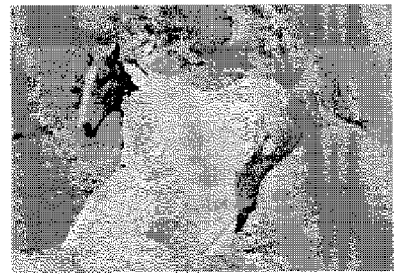
Figure 8A:
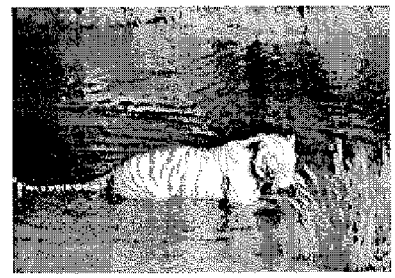
FIGS. 8a to d show in FIG. 8a an input image, in FIG. 8b the result of the application of the present invention, in FIG. 8c the application of the SWA and in FIG. 8d the result of the prior art (the so called "normalized-cuts"—spectral method).
Figure 8B:
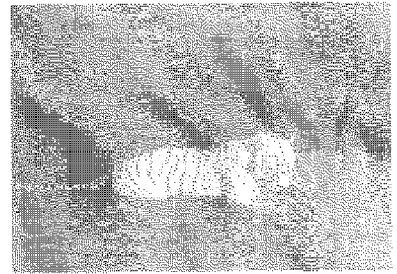
Figure 8C:
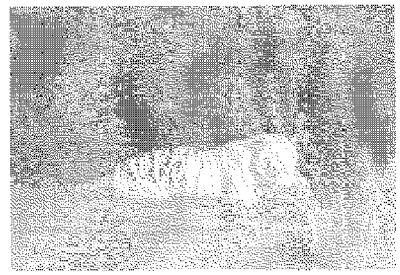
Figure 8D:
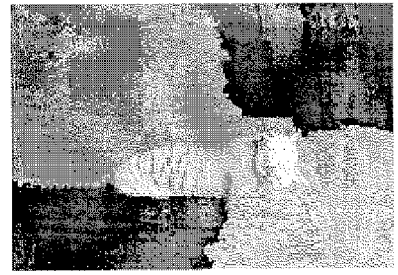
Figure 9A:
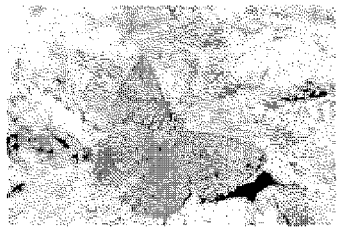
FIGS. 9a to c show in FIG. 9a an input image, in FIG. 9b the result of the application of the present invention and in FIG. 9c the result of the prior art (the so called "normalized-cuts"—spectral method).
Figure 9B:
Figure 9C:
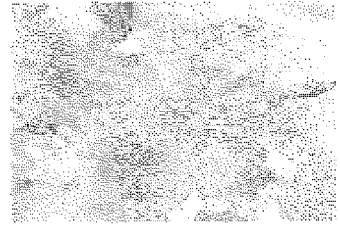

FIGS. 5a to d contrasts the effect of averaging over aggregates with the effect of "geometric" averaging that ignores the regions in the image. In the middle row the image is tiled with 10×10 pixel squares, and each pixel is assigned with the average intensity of the square to which it belongs. In the bottom row every pixel is assigned with the average intensity of the aggregate it belongs to, FIG. 5a. To construct this image the method used aggregates of level 6. All together there were 414 aggregates of approximately 73 pixels each. FIG. 5b shows "reconstructions" of the original image through interpolation. Notice that averaging over squares leads to a blurry image, whereas inventive method preserves the discontinuities in the image. In particular notice how with the geometric averaging the horse's belly blends smoothly into the grass, whereas with the inventive method it is separated from the grass by a clear edge, see FIGS. 5a to 5d.

Figure 10A:
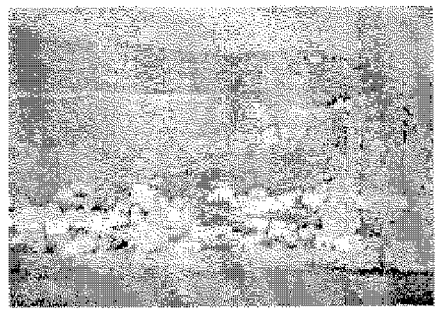
FIGS. 10a and b show in FIG. 10a an input image, in FIG. 10b the result of the application of the present invention.
Figure 10B:
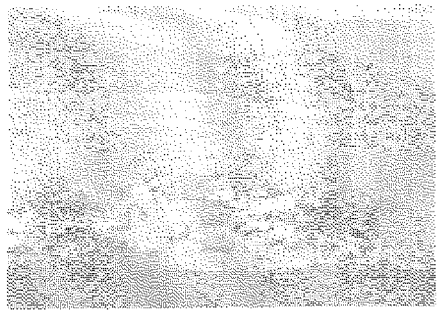

FIGS. 6a to 6d to FIGS. 9a to 9c show four images of animals in various backgrounds. The FIGS. 6-9 show the results of running the three algorithms on these images. Segmentation results are shown as gray color-thick contours-color overlays on top of the original gray scale images. In all four figures the algorithm of the inventive method manages to detect the animal as a salient region. In FIGS. 8a to 8d showing a tiger, in particular, the inventive method manages to separate the tiger from the background although it does not use any measure of oriented texture. In addition, the second, finer level the inventive method also separates the bush from the water. The SWA algorithm barely finds the horse in FIG. 6 and has some "bleeding" problems with the tiger. This is probably because the algorithm does not incorporate a texture measure in the segmentation process. The normalized cuts algorithm yields significant over-fragmentation of the animals, and parts of the animals often merge with the background. This is typical in many existing known segmentation algorithms. Another example is shown in FIGS. 10a and 10b showing a village against a background of a mountain and a lake. Notice that the village, the mountain, and the lake are separated by the inventive method.

Figure 11A:
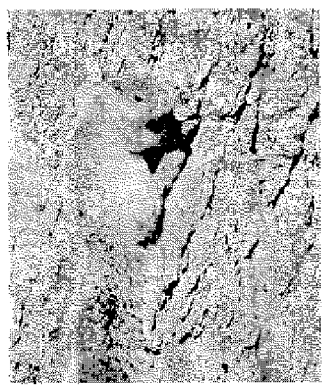
FIGS. 11a to c show in FIG. 11a an input image, in FIG. 11b the result of the application of the present invention and in FIG. 11c the result of the prior art (the so called "normalized-cuts"—spectral method).
Figure 11B:
Figure 11C:
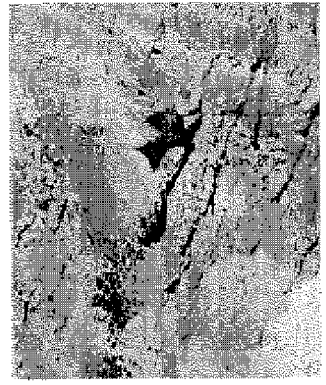

The experiments were concludes with two famous examples of camouflage images. FIGS. 11a to 11c show a squirrel climbing a tree. The inventive method including the novel algorithm finds the squirrel and its tail as the two most salient segments. The tree trunk is over-segmented, possibly due to the lack of use of oriented texture cues. The normalized cuts algorithm, for comparison, shows significant amounts of "bleeding." Finally, in FIGS. 12a to 12b a Dalmatian is shown sniffing the ground against a black and white setting. The inventive method using the novel algorithm extracts the head and belly of the Dalmatian dog, and most of its body is detected with some "bleeding." Such a segmentation can perhaps be used as a precursor for attention in this particularly challenging image.

The normalized cuts technique was significantly slower than the other two methods, SWA and the improved method. Running the normalized cuts method on a 200×200 pixel image using a dual processor Pentium III 1000 MHz took 10-15 minutes. The implementation of the inventive method applied to an image of the same size took about 5 seconds on a Pentium III 750 MHz laptop.

The inventive method and apparatus employs a segmentation algorithm that incorporates different properties at different levels of scale. The algorithm avoids the over-averaging of coarse measurements, which is typical in many multiscale methods, by measuring properties simultaneously with the segmentation process. For this process it uses the irregular pyramid proposed in the first embodiment to approximate graph-cut algorithms. The process of building the pyramid is efficient, and the measurement of properties at different scales integrates with the process with almost no additional cost. The algorithm is demonstrated by applying it to several natural images and comparing it to other, state-of-the-art algorithms. Experiments show that the inventive method and novel algorithm achieves dramatic improvement in the quality of the segmentation relative to the tested methods. The algorithm can further be improved by incorporating additional measures, e.g., of oriented texture. Moreover, the multiscale representation of the image obtained with the pyramid can be used to facilitate high level processes such as object recognition.

In FIG. 13 there is shown a flow chart in generalized form that shows the general steps of the method, all of which have been elaborated in detail in the foregoing description of the detailed specific embodiments. As shown, in step S1 a graph is constructed from an image. In step S2 some pixels of the image have been selected as block pixels with unselected pixels coupled to a block pixel, i.e. neighboring pixel as described in the foregoing. This establishes aggregates. Next, in step S3 the graph is coarsened through a procedure of iterative weighted aggregation in order to obtain a hierarchical decomposition of the image and to form a pyramid over the image. During the iterations, as described in detail in the foregoing, the aggregates are agglomerated into larger aggregates according to the rules provided and as detailed in the foregoing. In this fashion it becomes possible to identify segments in the pyramid in step S4. Then, in step S5 the saliency of segments in the pyramid are detected, and in step S6 the segments are sharpened to determine their boundaries more accurately. This is a generalized description of the method, and as will be evident from the foregoing, there is considerable detail concerning each step, as elaborated in the foregoing.

Figure 14:
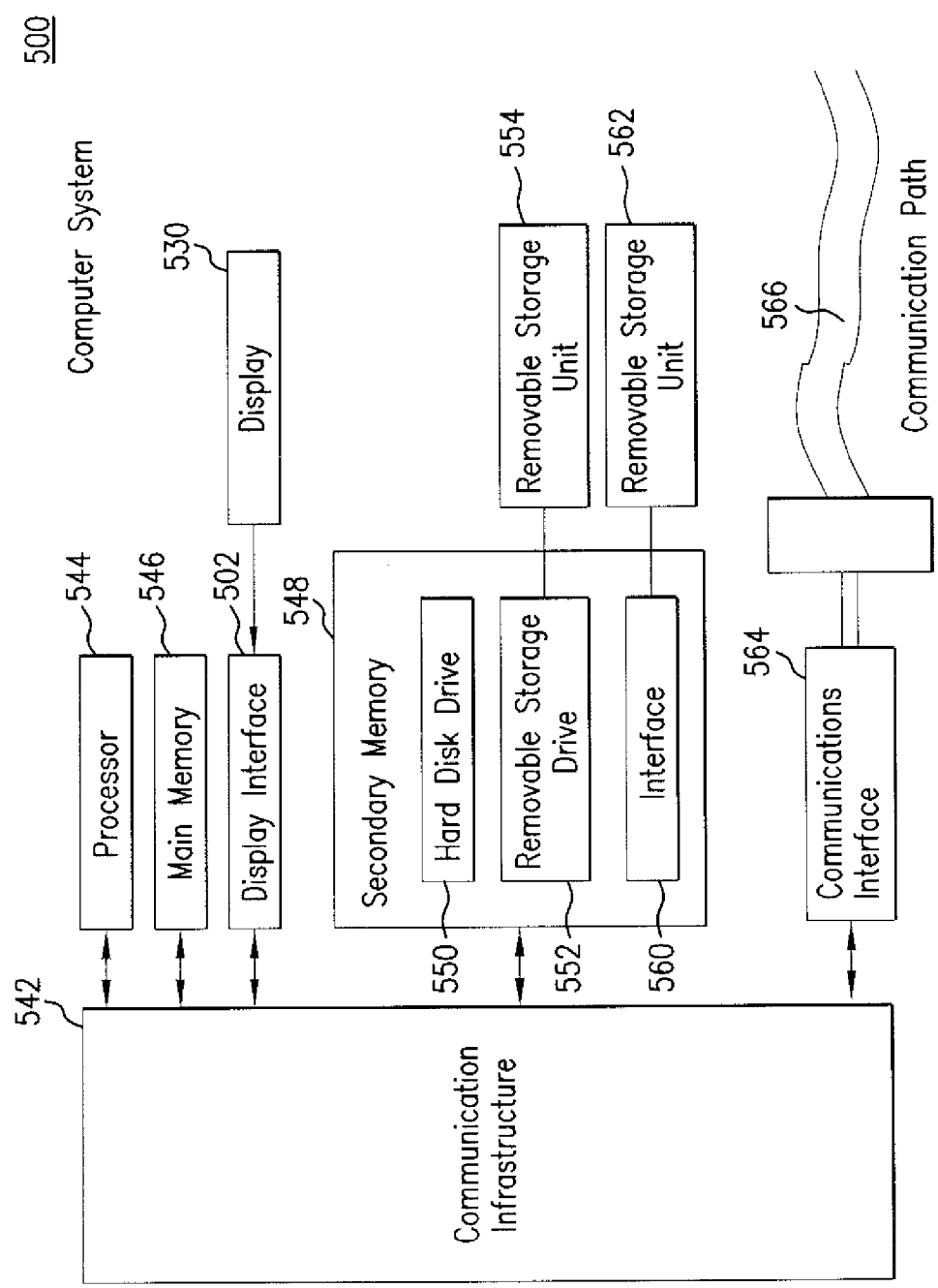
FIG. 14 is a block diagram of an exemplary computer system useful for implementing the present invention.

The present invention (i.e., system described in detail in this description of specific embodiments and as generally depicted in FIG. 13 or any part thereof may be implemented using hardware, software or a combination thereof and may be implemented in one or more computer systems or other processing systems, and the capability would be within the skill of one ordinarily skilled in the art of programming of computers from the teachings and detailed disclosure provided in the foregoing. In fact, an example of a computer system 500 is shown in FIG. 14. The computer system 500 represents any single or multi-processor computer. In conjunction, single-threaded and multi-threaded applications can be used. Unified or distributed memory systems can be used. Computer system 500, or portions thereof, may be used to implement the present invention. For example, the system 100 of the present invention may comprise software running on a computer system such as computer system 500.

In one example, the system and method of the present invention is implemented in a multi-platform (platform independent) programming language such as Java, programming language/structured query language (PL/SQL), hypertext mark-up language (HTML), practical extraction report language (PERL), Flash programming language, common gateway interface/structured query language (CGI/SQL) or the like. Java-enabled and JavaScript-enabled browsers are used, such as, Netscape, HotJava, and Microsoft Explorer browsers. Active content web pages can be used. Such active content web pages can include Java applets or ActiveX controls, or any other active content technology developed now or in the future. The present invention, however, is not intended to be limited to Java, JavaScript, or their enabled browsers, and can be implemented in any programming language and browser, developed now or in the future, as would be apparent to a person skilled in the relevant art(s) given this description.

In another example, system and method of the present invention, may be implemented using a high-level programming language (e.g., C++) and applications written for the Microsoft Windows NT or SUN OS environments. It will be apparent to persons skilled in the relevant art(s) how to implement the invention in alternative embodiments from the teachings herein.

Computer system 500 includes one or more processors, such as processor 544. One or more processors 544 can execute software implementing the routines described above, such as shown in FIG. 13 and described in the foregoing. Each processor 544 is connected to a communication infrastructure 542 (e.g., a communications bus, crossbar, or network). Various software embodiments are described in terms of this exemplary computer system. After reading this description, it will become apparent to a person skilled in the relevant art how to implement the invention using other computer systems and/or computer architectures.

Computer system 500 can include a display interface 502 that forwards graphics, text, and other data from the communication infrastructure 542 (or from a frame buffer not shown) for display on the display unit 530.

Computer system 500 also includes a main memory 546, preferably random access memory (RAM), and can also include a secondary memory 548. The secondary memory 548 can include, for example, a hard disk drive 550 and/or a removable storage drive 552, representing a floppy disk drive, a magnetic tape drive, an optical disk drive, etc. The removable storage drive 552 reads from and/or writes to a removable storage unit 554 in a well known manner. Removable storage unit 554 represents a floppy disk, magnetic tape, optical disk, etc., which is read by and written to by removable storage drive 552. As will be appreciated, the removable storage unit 554 includes a computer usable storage medium having stored therein computer software and/or data.

In alternative embodiments, secondary memory 548 may include other similar means for allowing computer programs or other instructions to be loaded into computer system 500. Such means can include, for example, a removable storage unit 562 and an interface 560. Examples can include a program cartridge and cartridge interface (such as that found in video game console devices), a removable memory chip (such as an EPROM, or PROM) and associated socket, and other removable storage units 562 and interfaces 560 which allow software and data to be transferred from the removable storage unit 562 to computer system 500.

Computer system 500 can also include a communications interface 564. Communications interface 564 allows software and data to be transferred between computer system 500 and external devices via communications path 566. Examples of communications interface 564 can include a modem, a network interface (such as Ethernet card), a communications port, interfaces described above, etc. Software and data transferred via communications interface 564 are in the form of signals that can be electronic, electromagnetic, optical or other signals capable of being received by communications interface 564, via communications path 566. Note that communications interface 564 provides a means by which computer system 500 can interface to a network such as the Internet.

The present invention can be implemented using software running (that is, executing) in an environment similar to that described above with respect to FIG. 13 and in the foregoing. In this document, the term "computer program product" is used to generally refer to removable storage unit 554, a hard disk installed in hard disk drive 550, or a carrier wave carrying software over a communication path 566 (wireless link or cable) to communication interface 564. A computer useable medium can include magnetic media, optical media, or other recordable media, or media that transmits a carrier wave or other signal. These computer program products are means for providing software to computer system 500.

Computer programs (also called computer control logic) are stored in main memory 546 and/or secondary memory 548. Computer programs can also be received via communications interface 564. Such computer programs, when executed, enable the computer system 500 to perform the features of the present invention as discussed herein. In particular, the computer programs, when executed, enable the processor 544 to perform features of the present invention. Accordingly, such computer programs represent controllers of the computer system 500.

The present invention can be implemented as control logic in software, firmware, hardware or any combination thereof. In an embodiment where the invention is implemented using software, the software may be stored in a computer program product and loaded into computer system 500 using removable storage drive 552, hard disk drive 550, or interface 560. Alternatively, the computer program product may be downloaded to computer system 500 over communications path 566. The control logic (software), when executed by the one or more processors 544, causes the processor(s) 544 to perform functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s) from the teachings herein.

As has been noted above, the present invention could be produced in hardware or software, or in a combination of hardware and software, and these implementations would be known to one of ordinary skill in the art. The system, or method, according to the inventive principles as disclosed in connection with the preferred embodiments, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as a local area network (LAN) or widely distributed network (WAN) over a telecommunications system (such as the Internet) as would be known to a person of ordinary skill in the art.

Although the invention has been described in specific embodiments, changes and modification are possible that do not depart from the teachings herein. Such changes and modifications as are apparent to one skilled in this art are deemed to fall within the purview of the claims.

What is claimed is:

1. A method for processing an image comprising the steps of:
   I. in a first stage:
   a. constructing a graph of an image to be processed wherein each node of the graph represents a pixel of the image,
   b. determining a weight associated arc indicative of the likelihood of an edge separating said each node from each of its neighboring nodes;
   c. coarsening the graph by iterative weighted aggregation to construct a multilevel pyramid over the graph to obtain hierarchical decomposition of the image to reveal segments in the image wherein for the first level up of the pyramid a first smaller set of aggregates is selected from the nodes based on their weight associated arcs, and new updated weight associated arcs are determined for a member of the set relative to its neighbors, and for each further level up, still smaller sets of larger aggregates are selected from the set of aggregates of the next level down and any remaining nodes based on their weight associated arcs, and new updated weight associated arcs are determined for a member of the set relative to its neighbors; and
   d. detecting segments in the pyramidal structure;
   II. in a second stage:
   e. determining which nodes of the graph belong to each detected segment by determining recursively a degree of attachment of every node of the graph to each of the detected segments in the pyramid according to a first preselected parameter associated with the segments; and
   f. sharpening the boundaries of a segment by iteratively changing a preselected second parameter of the segment and iteratively determining until the preselected second parameter reaches an end value whereby a processed image is obtained; and
   g. outputting the processed image.

2. The method of claim 1 including the further step of displaying the processed image.

3. The method of claim 1 including the further steps of determining an internal statistic of segments as detected and applying the internal statistic to any further coarsening step.

4. The method of claim 1 wherein the first preselected parameter is a state vector.

5. The method of claim 1 wherein the second preselected parameter is an energy functional.

6. Apparatus for processing an image comprising:
   I. a first subassembly including:
   a. means for constructing a graph of an image to be processed wherein each node of the graph represents a pixel of the image,
   b. means for determining a weight associated arc indicative of the likelihood of an edge separating said each node from each of its neighboring nodes;
   c. means for coarsening the graph by iterative weighted aggregation to construct a multilevel pyramid over the graph to obtain hierarchical decomposition of the image to reveal segments in the image wherein for the first level up of the pyramid, a first smaller set of aggregates is selected from the nodes based on their weight associated arcs, and new updated weight associated arcs are determined for a member of the set relative to its neighbors, and for each further level up, still smaller sets of larger aggregates are selected from the set of aggregates of the next level down and any remaining nodes based on their weight associated arcs, and new updated weight associated arcs are determined for a member of the set relative to its neighbors; and
   d. detecting segments in the pyramidal structure;
   II. a second subassembly including:
   e. means for determining which nodes of the graph belong to each detected segment by determining recursively a degree of attachment of every node of the graph to each of the detected segments in the pyramid according to a first preselected parameter associated with the segments; and
   f. means for sharpening the boundaries of each segment by iteratively changing a preselected second parameter of the segment, and iteratively determining until the preselected second parameter reaches an end value, whereby a processed image is obtained; and
   g. means for outputting the processed image.

7. The apparatus of claim 6 including means for displaying the processed image.

8. The apparatus of claim 6 including means for determining an internal statistic of segments as detected, and means for applying the internal statistic to any further coarsening step.

9. The apparatus of claim 6 wherein the first preselected parameter is a state vector.

10. The apparatus of claim 6 wherein the second preselected parameter is an energy functional.

11. A computer program product comprising computer-readable medium having executable instructions embodied therein for processing an image comprising:
   I. a first set of instructions including:
      a. a construction function for constructing a graph of an image to be processed wherein each node of the graph represents a pixel of the image,
      b. a determination function for determining a weight associated arc indicative of the likelihood of an edge separating said each node from each of its neighboring nodes;
      c. a coarsening function for coarsening the graph by iterative weighted aggregation to construct a multi-level pyramid over the graph to obtain hierarchical decomposition of the image to reveal segments in the image wherein for the first level up of the pyramid a first smaller set of aggregates is selected from the nodes based on their weight associated arcs, and new updated weight associated arcs are determined for a member of the set relative to its neighbors, and for each further level up, still smaller sets of larger aggregates are selected from the set of aggregates of the next level down and any remaining nodes based on their weight associated arcs, and new updated weight associated arcs are determined for a member of the set relative to its neighbors; and
      d. a detection function for detecting segments in the pyramidal structure;
   II. a second set of instructions including:
      e. another determination function for determining which nodes of the graph belong to each detected segment by determining recursively a degree of attachment of every node of the graph to each of the detected segments in the pyramid according to a first preselected parameter associated with the segments; and
      f. a sharpening function for sharpening the boundaries of a segment by iteratively changing a preselected second parameter of the segment and iteratively determining until the preselected second parameter reaches an end value whereby a processed image is obtained; and
      g. instructions for outputting the processed image.

12. A computer program product of claim 11 including further instructions for displaying the processed image.

13. A computer program product of claim 11 including further instructions for determining an internal statistic of segments as detected, and for applying the internal statistic to any further coarsening.

14. A computer program product claim 11 wherein the first preselected parameter is a state vector.

15. A computer program product of claim 11 wherein the second preselected parameter is an energy functional.

* * * * *